US012302380B2

(12) United States Patent
Kishida et al.

(10) Patent No.: US 12,302,380 B2
(45) Date of Patent: May 13, 2025

(54) BASE STATION, TERMINAL APPARATUS, AND WIRELESS COMMUNICATION METHOD

(71) Applicant: Nippon Telegraph and Telephone Corporation, Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 348 days.

(21) Appl. No.: 17/791,464

(22) PCT Filed: Jan. 10, 2020

(86) PCT No.: PCT/JP2020/000669
§ 371 (c)(1),
(2) Date: Jul. 7, 2022

(87) PCT Pub. No.: WO2021/140650
PCT Pub. Date: Jul. 15, 2021

(65) Prior Publication Data
US 2023/0042638 A1 Feb. 9, 2023

(51) Int. Cl.
*H04W 74/00* (2009.01)
*H04W 72/04* (2023.01)

(52) U.S. Cl.
CPC ......... *H04W 74/002* (2013.01); *H04W 72/04* (2013.01)

(58) Field of Classification Search
CPC ........................... H04W 74/002; H04W 72/04
See application file for complete search history.

(56) References Cited

U.S. PATENT DOCUMENTS

| 2013/0088983 | A1* | 4/2013 | Pragada | ................ | H04W 24/08 |
| | | | | | 370/252 |
| 2014/0307653 | A1* | 10/2014 | Liu | ...................... | H04B 7/2612 |
| | | | | | 370/329 |
| 2018/0205584 | A1* | 7/2018 | Lim | ...................... | H04L 5/0092 |
| 2019/0223219 | A1 | 7/2019 | Ahn et al. | | |

FOREIGN PATENT DOCUMENTS

GB            2555455          5/2018

OTHER PUBLICATIONS

[No Author Listed], "Part 11: Wireless LAN Medium Access Control (MAC) and Physical Layer (PHY) Specifications: 9.3.3.3 Beacon frame format and 10.22.2 HCF contention based channel access (EDCA)," IEEE Std 802.11-2016, Dec. 7, 2016, 22 pages.
[No Author Listed], "Part 11: Wireless LAN medium access control (MAC) and physical layer (PHY) specifications," IEEE International Standard 802.11-2016, Dec. 2016, ISO/IEC/IEEE 8802-11, 5 pages.

* cited by examiner

*Primary Examiner* — Duc C Ho
(74) *Attorney, Agent, or Firm* — Fish & Richardson P.C.

(57) ABSTRACT

A base station according to an embodiment of the present disclosure includes a generation unit (35) that generates a beacon including switching information (41) indicating whether to cooperatively use a frequency channel and a transmission unit (32) that transmits the beacon.

6 Claims, 11 Drawing Sheets

BASE STATION, TERMINAL APPARATUS, AND WIRELESS COMMUNICATION METHOD

CROSS-REFERENCE TO RELATED APPLICATIONS

This application is a National Stage application under 35 U.S.C. § 371 of International Application No. PCT/JP2020/000669, having an International Filing Date of Jan. 10, 2020, the disclosure of which is considered part of the disclosure of this application, and is incorporated in its entirety into this application.

TECHNICAL FIELD

Embodiments of the present disclosure relate to a base station, a terminal apparatus, and a wireless communication method.

BACKGROUND ART

In a wireless local area network (LAN), a wireless device such as a terminal or a base station accesses a frequency channel using carrier sense multiple access with collision avoidance (CSMA/CA) or enhanced distribution channel access (EDCA) to transmit a wireless signal. In CSMA/CA or EDCA, the wireless device waits for a period of time determined by access parameters, then confirms through a carrier sense that the frequency channel is not being used by another wireless device, and transmits the wireless signal. The access parameters are controlled for each basic service set (BSS).

CITATION LIST

Non Patent Literature

NPL 1: IEEE Std 802.11-2016. "9.3.3.3 Beacon frame format" and "10.22.2 HCF contention based channel access (EDCA)", 7 Dec. 2016.

SUMMARY OF THE INVENTION

Technical Problem

In wireless communication, it is necessary that high reliability such as low latency be able to be secured. For example, a real-time application (RTA) such as a control application for a network game or an industrial robot may have allowable conditions for a communication delay. However, even if the base station adjusts the access parameters to satisfy the allowable conditions for a communication delay of the RTA, it may not be possible to secure the required low latency in a case in which another BSS using the same frequency channel is at a nearby location.

Means for Solving the Problem

A base station according to an aspect of the present disclosure includes: a generation unit that generates a beacon including switching information indicating whether to cooperatively use a frequency channel; and a transmission unit that transmits the beacon.

Advantageous Effects of the Invention

According to the aspect of the present disclosure, there is provided a wireless communication technique with high reliability.

DESCRIPTION OF EMBODIMENTS

Hereinafter, embodiments of the present disclosure will be described with reference to the drawings.

Overview

Figure 1:
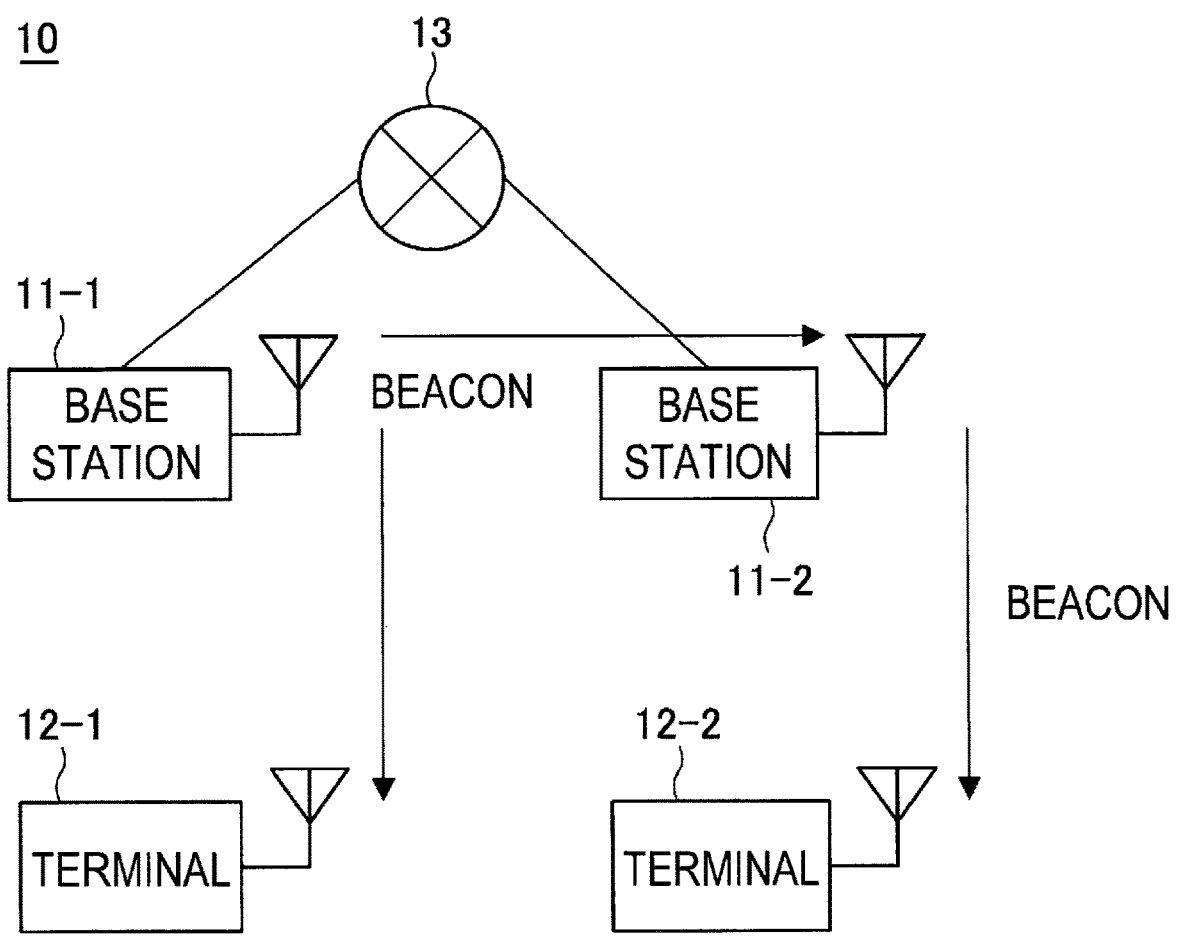
FIG. 1 is a block diagram illustrating a communication system according to an embodiment.

FIG. 1 schematically illustrates a communication system 10 according to an embodiment. As illustrated in FIG. 1, the communication system 10 includes base stations 11 (base stations 11-1 and 11-2), terminals 12 (terminals 12-1 and 12-2), and a network 13.

Each base station 11 is connected to the network 13 in a wired manner, for example, and relays communication between an information processing apparatus (a server, for example) in the network 13, which is not illustrated, and the terminals 12. The network 13 may include a local area network (LAN), a wide area network (WAN), or both. Note that the base stations 11-1 and 11-2 mutually may be connected to different networks.

The base stations 11 perform wireless communication with the terminals 12. In the example illustrated in FIG. 1, the base station 11-1 performs wireless communication with the terminal 12-1, and the base station 11-2 performs wireless communication with the terminal 12-2. The number of terminals 12 that perform wireless communication with each base station 11 dynamically changes. In the present embodiment, Wi-Fi (registered trademark) is used for communication between the base stations 11 and the terminals 12. The base stations 11 correspond to Wi-Fi access points (APs) while the terminals 12 correspond to Wi-Fi clients. Note that wireless LAN standards other than Wi-Fi may be used.

It is assumed that the base stations 11-1 and 11-2 form different basic service sets (BSSs). In the example illustrated in FIG. 1, the terminal 12-1 belongs to the BSS of the base station 11-1, and the terminal 12-2 belongs to the BSS of the base station 11-2. Moreover, it is assumed that the base stations 11-1 and 11-2 use the same frequency channel. For example, W52 that is one of 5 GHz band channel groups can use four frequency channels (36ch, 40ch, 44ch, and 48ch). The base stations 11 dynamically switch the frequency channels to be used from among a plurality of available frequency channels. In the following description, the frequency channels will also simply be referred to as channels.

The base station 11 periodically transmits a beacon including communication channel information and cooperative utilization channel information. The communication channel information indicates information related to a channel that the base station 11 is using. The communication channel information includes channel identification information for identifying the channel in use and access parameters for accessing the channel. The cooperative utilization channel information indicates information related to a channel to be cooperatively used among the base stations 11. The cooperative utilization channel information includes switching information (also referred to as cooperative utilization switching information) indicating whether to cooperatively use the target channel. In a case in which the switching information indicates that the target channel is to be cooperatively used, the cooperative utilization channel information further includes channel identification information for identifying the target channel and the access parameter for accessing the target channel. Ordinarily, the switching information is set to be information indicating that the channel is not to be cooperatively used.

The terminal 12 receives a beacon from the base station 11 and acquire the communication channel information from the beacon. The terminal 12 accesses a channel in accordance with the channel identification information and the access parameters included in the acquired communication channel information. The terminal 12 performs authentication and association with the base station 11 in order to establish wireless connection with the base station 11. Thereafter, the terminal 12 performs data exchange with the base station 11.

The terminal 12-1 communicates various kinds of data (traffic) including data with an allowable condition for a delay. For example, the terminal 12-1 transmits the data with an allowable condition for a delay to a server in the network 13 via the base station 11-1 or receives the data with the allowable condition for a delay from the server in the network 13 via the base station 11-1. In one example, an application requiring fast response of communication (communication with the server in the network 13, for example) has been installed on the terminal 12-1. If the application is activated, then the terminal 12-1 transmits, to the base station 11-1, a cooperation request for requesting cooperative utilization of a channel in response to a request from the application. In this manner, the terminal 12-1 requests the base station 11 for utilization of the channel for a specific application.

When the base station 11-1 receives the cooperation request from the terminal 12-1, the base station 11-1 selects a channel to be cooperatively used from among the available channels. For example, the base station 11-1 selects the channel in use as the channel to be cooperatively used. Moreover, the base station 11-1 sets the access parameter for accessing the channel to be cooperatively used. The base station 11-1 generates a beacon including the switching information set to be information indicating that the channel is to be cooperatively used and transmits the generated beacon. In this beacon, the channel identification information and the access parameter included in the communication channel information may be the same as the channel identification information and the access parameter included in the cooperative utilization channel information.

When the terminal 12-1 receives the beacon from the base station 11-1, the terminal 12-1 accesses the channel in accordance with the communication channel information included in the beacon and communicates with the base station 11-1. In this manner, the terminal 12-1 communicates with the base station 11-1 in accordance with the access parameter set in response to the cooperation request. In other words, the terminal 12-1 communicates with the base station 11-1 using the channel to be cooperatively used which is designated by the base station 11-1.

The base station 11-2 is present in a coverage area of the base station 11-1. In other words, the base station 11-2 is located within the reach of radio waves emitted by the base station 11-1. Thus, the base station 11-2 receives the beacon from the base station 11-1. The base station 11-2 recognizes that the switching information included in the received beacon indicates that the channel is to be cooperatively used. In a case in which the channel identification information included in the cooperative utilization channel information indicates the same channel as the channel that the base station 11-2 is using, the base station 11-2 generates a beacon in which the same access parameter as the access parameter included in the cooperative utilization channel information is included in the communication channel information and transmits the generated beacon.

When the terminal 12-2 receives the beacon from the base station 11-2, the terminal 12-2 accesses the channel in accordance with the communication channel information included in the beacon and communicates with the base station 11-2. In this manner, the terminal 12-2 communicates with the base station 11-2 in accordance with the access parameter set in response to the cooperation request from the terminal 12-1.

In the aforementioned communication system 10, the same access parameter, that is, a unified access parameter used in relation to a specific channel is used in a surrounding environment of the base station 11-1. The access parameter is controlled in a unified manner among BSSs. It is thus possible to avoid degradation of communication quality due to influences of BSSs that are different from the BSS of the base station 11-1. As a result, reliability of wireless communication is improved.

Configuration

Figure 2:
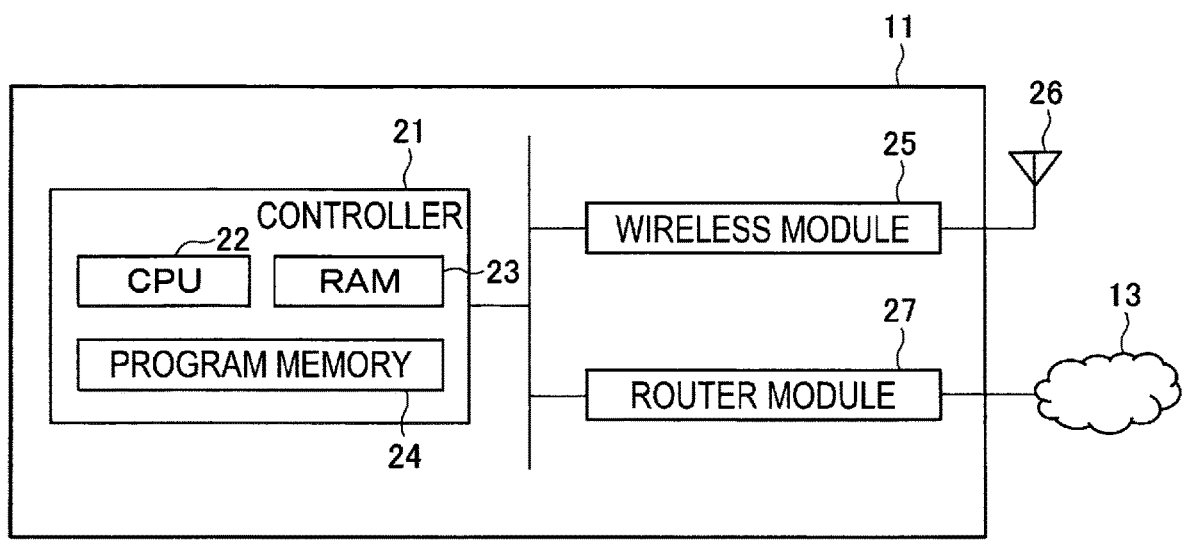
FIG. 2 is a block diagram illustrating a hardware configuration example of a base station illustrated in FIG. 1.

FIG. 2 schematically illustrates an example of a hardware configuration of each base station 11. The base station 11 may be fixed or movable. As illustrated in FIG. 2, the base station 11 includes a controller 21, a wireless module 25, an antenna 26, and a router module 27. The controller 21 is connected to the wireless module 25 and the router module 27.

The controller 21 processes data and controls other components. The controller 21 includes a central processing unit (CPU) 22, a random access memory (RAM) 23, and a program memory 24. The CPU 22 is an example of a general-purpose processor. The RAM 23 is used as a working memory by the CPU 22. The RAM 23 includes a volatile memory such as a synchronous dynamic random access memory (SDRAM). The program memory 24 stores a program to be executed by the CPU 22. As the program memory 24, a read-only memory (ROM) or NOR-type flash memory, for example, is used. The controller 21 operates in accordance with the program. For example, the CPU 22 performs data processing in accordance with the program by loading, onto the RAM 23, the program stored in the program memory 24 and interpreting and executing the program.

The wireless module 25 is configured to perform wireless communication with external information processing apparatuses (the terminals 12 illustrated in FIG. 1, for example). In the present embodiment, the wireless module 25 is a Wi-Fi module. The wireless module 25 may be a processing circuit including a processor, a memory, and a radio frequency (RF) circuit, such as a chipset. The wireless module 25 includes a transmitter and a receiver. The wireless module 25 is connected to the antenna 26. Note that the antenna 26 may be included in the wireless module 25.

The wireless module 25 converts a media access control (MAC) frame into a wireless signal and transmits the wireless signal via the antenna 26. For example, the wireless module 25 converts a beacon frame into a wireless signal and transmits the wireless signal via the antenna 26. The beacon frame is transmitted at a predetermined time interval (at an interval of 100 ms, for example). Further, the wireless module 25 receives data from the controller 21, generates a data frame including the received data, converts the generated data frame into a wireless signal, and transmits the wireless signal via the antenna 26.

Furthermore, the wireless module 25 receives the wireless signal via the antenna 26 and acquires the MAC frame from the received wireless signal. For example, the wireless module 25 receives a wireless signal corresponding to a data frame via the antenna 26, acquires data from the received wireless signal, and transfers the acquired data to the controller 21. In addition, the wireless module 25 receives a wireless signal corresponding to a beacon frame or a cooperation request frame via the antenna 26, acquires the beacon frame or the cooperation request frame from the received wireless signal, and processes the acquired beacon frame or cooperation request frame. The cooperation request frame may be defined as a type of control frames.

The router module 27 is configured to communicate with the network 13. For example, the router module 27 exchanges data with the server in the network 13. The router module 27 may be a processing circuit including a processor and a memory. Note that the router module 27 may not be provided in the base station 11. The base station 11 may be configured to access a router provided outside the base station 11 through wireless communication or wired communication and connect to the network 13 via the router.

In the aforementioned example, the controller 21 includes a general-purpose processor. Alternatively or additionally, the controller 21 may include a dedicated processor. For example, the controller 21 may be implemented by an application specific integrated circuit (ASIC) or a field programmable gate array (FPGA).

Figure 3:
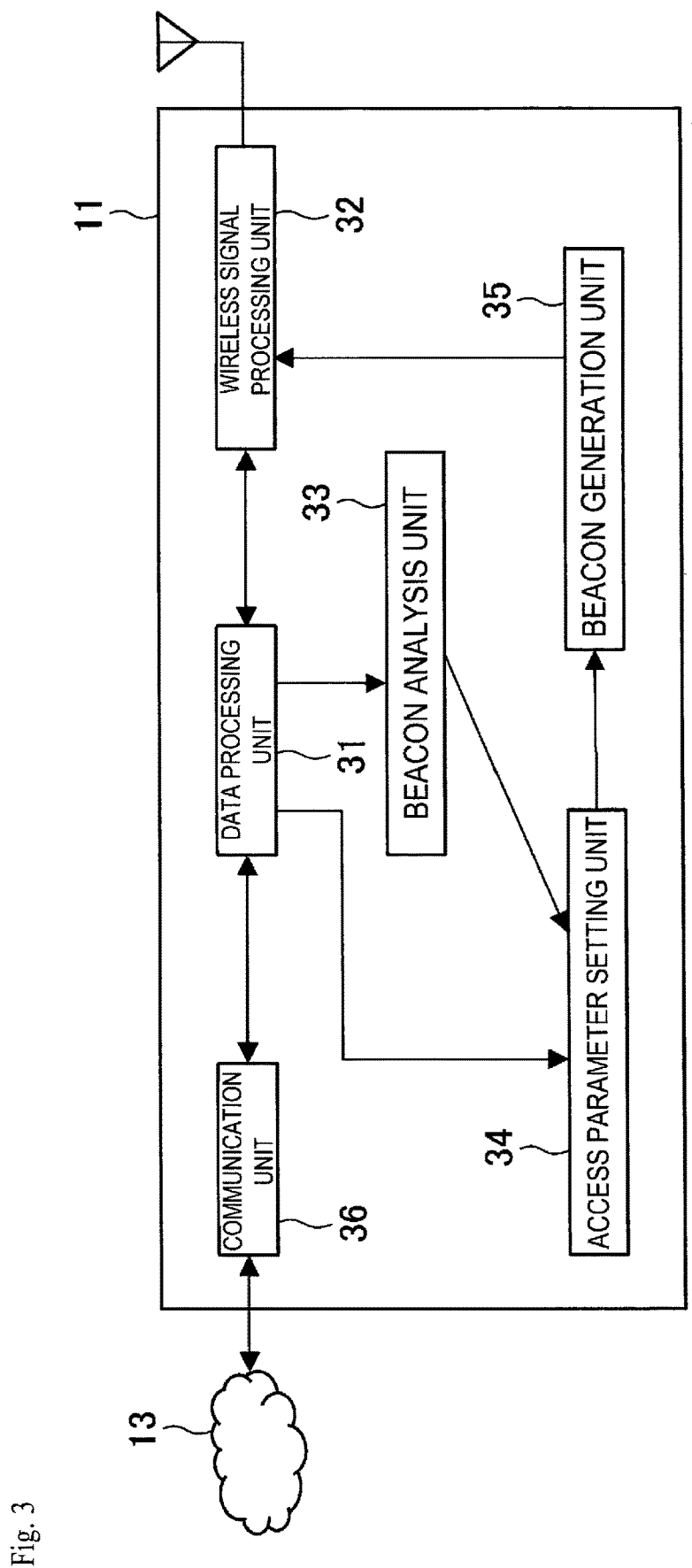
FIG. 3 is a block diagram illustrating a functional configuration example of the base station illustrated in FIG. 1.

FIG. 3 schematically illustrates an example of a functional configuration of the base station 11. As illustrated in FIG. 3, the base station 11 includes a data processing unit 31, a wireless signal processing unit 32, a beacon analysis unit 33, and an access parameter setting unit 34, a beacon generation unit 35, and a communication unit 36. The wireless signal processing unit 32 includes a transmission unit that transmits a wireless signal and a reception unit that receives a wireless signal. The data processing unit 31, the wireless signal processing unit 32, the beacon analysis unit 33, the access parameter setting unit 34, and the beacon generation unit 35 are realized by a processing circuit including the controller 21 and the wireless module 25. In an example, a part of the data processing unit 31 is realized by the controller 21, and remaining parts of the data processing unit 31, the wireless signal processing unit 32, the beacon analysis unit 33, the access parameter setting unit 34, and the beacon generation unit 35 are realized by the wireless module 25. The communication unit 36 is realized by the router module 27.

The data processing unit 31 exchanges data with the network 13 via the communication unit 36. The data processing unit 31 receives data from the network 13 via the communication unit 36, generates a data frame including the received data, and transfers the generated data frame to the wireless signal processing unit 32. The wireless signal processing unit 32 receives the data frame from the data processing unit 31, converts the received data frame into a wireless signal, and transmits the wireless signal.

The wireless signal processing unit 32 receives a wireless signal, extracts an MAC frame from the received wireless signal, and transfers the extracted MAC frame to the data processing unit 31. The data processing unit 31 receives the MAC frame from the wireless signal processing unit 32. In a case in which the MAC frame is a data frame, the data processing unit 31 extracts data from the data frame and transmits the data to the network 13 via the communication unit 36. In a case in which the MAC frame is a cooperation request frame, the data processing unit 31 transfers the cooperation request frame to the access parameter setting unit 34. In a case in which the MAC frame is a beacon frame from another base station, the data processing unit 31 transfers the beacon frame to the beacon analysis unit 33.

Figure 4:
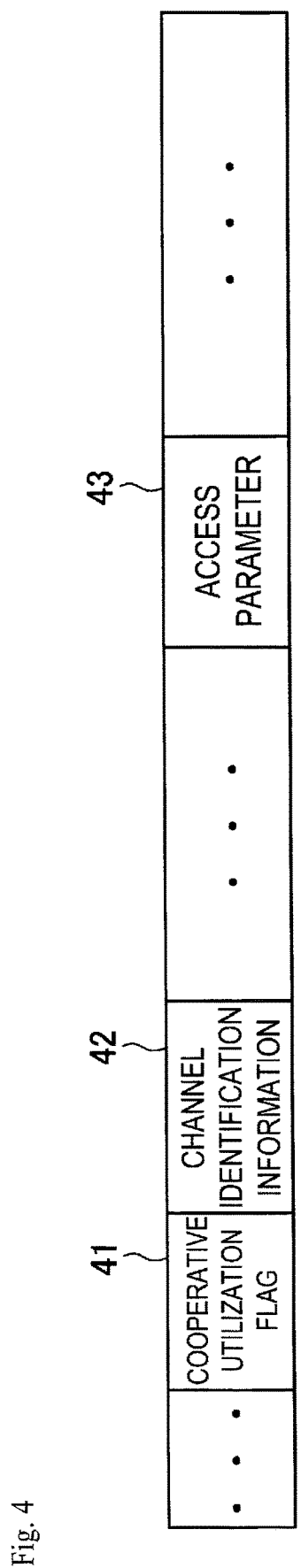
FIG. 4 is a diagram illustrating a structural example of a beacon frame according to an embodiment.

The beacon analysis unit 33 receives the beacon frame from the data processing unit 31 and analyzes the received beacon frame. As illustrated in FIG. 4, the beacon frame includes a field 41 that stores a cooperative utilization flag corresponding to switching information indicating whether to cooperatively use a channel, a field 42 that stores channel identification information for identifying the channel, and a field 43 that stores an access parameter value for accessing the channel. In an example, a value "1" is stored in the field 41 in a case in which the channel is to be cooperatively used, and a value "0" is stored in the field 41 in a case in which the channel is not to be cooperatively used. The beacon frame further includes a field that stores channel identification information for identifying a channel in use and a field that stores an access parameter value for accessing the channel in use.

Referring to FIG. 3 again, the beacon analysis unit 33 checks the cooperative utilization flag included in the beacon frame. In a case in which the cooperative utilization flag indicates that the channel is to be cooperatively used (that is, the cooperative utilization flag is 1), the beacon analysis unit 33 extracts the channel identification information and the access parameter value from the beacon frame and transfers the extracted channel identification information and the access parameter value to the access parameter setting unit 34.

The access parameter setting unit 34 sets the access parameter related to the channel in use. In an example in which the EDCA is employed as an access control scheme, the access parameter includes CWmax, CWmin, AIFS, and TXOP Limit for each access category. For example, there are four access categories, namely AC_VO (voice), AC_VI (video), AC_BE (best effort), and AC_BK (background). CWmax and CWmin are a maximum value and a minimum value of a contention window (CW) that is a transmission waiting time. Arbitration inter frame space (AIFS) is a frame transmission interval. TXOP Limit is an upper limit value of a transmission opportunity (TXOP) which is a channel occupation time. As the value of TXOP decreases, the amount of data that can be transmitted in one transmission right decreases while each terminal 12 can more easily obtain the transmission right. It is thus possible to improve the low latency properties by reducing the TXOP Limit value.

Ordinarily, the access parameter setting unit 34 sets the access parameter to a value prepared in advance. For example, the access parameter setting unit 34 may select a value from among a plurality of values prepared in advance in accordance with a communication status. In a case in which the access parameter setting unit 34 receives the cooperation request frame from the data processing unit 31, the access parameter setting unit 34 sets the access parameter based on information included in the cooperation request frame. In a case in which the cooperation request frame includes an allowable value for communication criteria such as a transmission delay, for example, the access parameter setting unit 34 may determine the access parameter value to satisfy the allowable value. In a case in which the cooperation request frame includes an access parameter value, the access parameter setting unit 34 may determine the access parameter as a value designated by the cooperation request frame. In a case in which the access parameter setting unit 34 receives an access parameter value from the beacon analysis unit 33, the access parameter setting unit 34 sets the access parameter to the value received from the beacon analysis unit 33.

The beacon generation unit 35 generates a beacon frame including communication channel information and cooperative utilization channel information. The communication channel information includes an access parameter value set by the access parameter setting unit 34. The cooperative utilization channel information includes the cooperative utilization flag, the channel identification information, and the access parameter value as illustrated in FIG. 4. The cooperative utilization flag is set to the value "1" indicating that the channel is to be cooperatively used, in response to the cooperation request from the terminal 12. The cooperative utilization flag may be set to the value "1" in response to cooperative utilization channel information included in a beacon from another base station 11.

The wireless signal processing unit 32 periodically transmits the beacon frame generated by the beacon generation unit 35. Specifically, the wireless signal processing unit 32 converts the beacon frame into a wireless signal and broadcasts the beacon frame converted into the wireless signal at a predetermined time interval.

Figure 5:
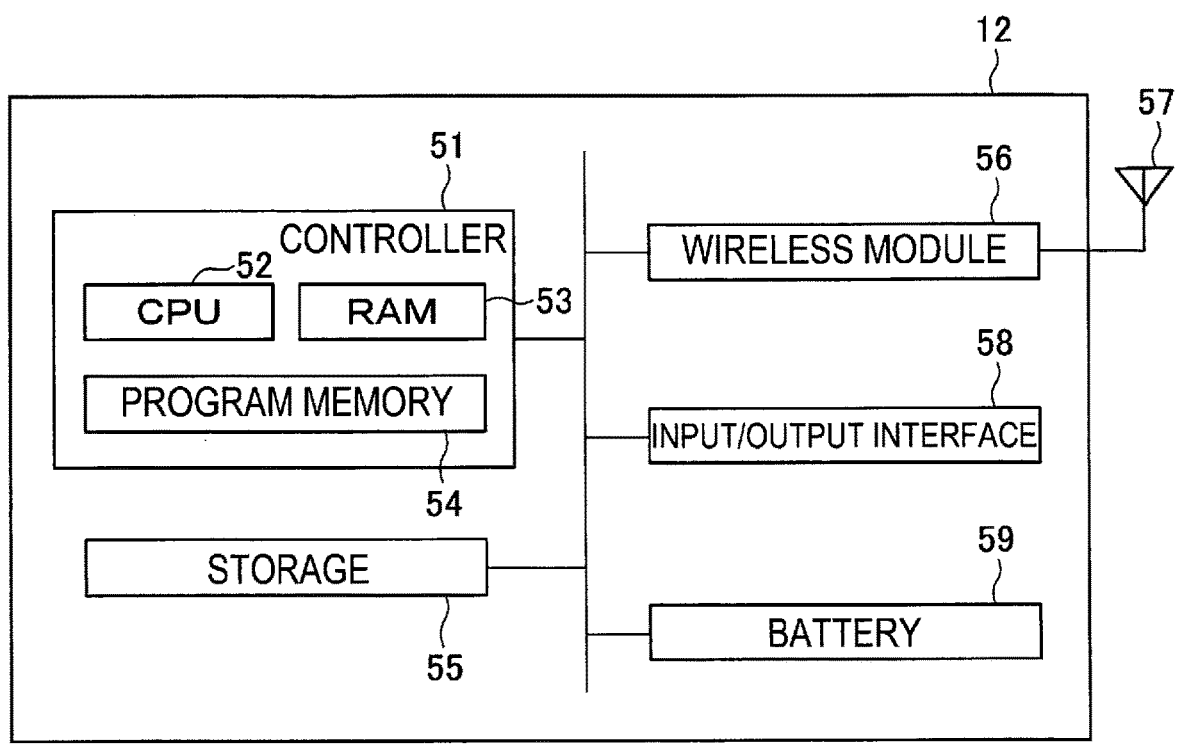
FIG. 5 is a block diagram illustrating a hardware configuration example of a terminal illustrated in FIG. 1.

FIG. 5 schematically illustrates an example of a hardware configuration of the terminal 12. The terminal 12 may be fixed or movable. Here, a mobile terminal apparatus such as a smartphone is assumed as the terminal 12. As illustrated in FIG. 5, the terminal 12 includes a controller 51, a storage 55, a wireless module 56, an antenna 57, an input/output interface 58, and a battery 59. The controller 51 is connected to the storage 55, the wireless module 56, the input/output interface 58, and the battery 59.

The controller 51 processes data and controls other components. The controller 51 includes a CPU 52, a RAM 53, and a program memory 54. The RAM 53 is used as a working memory by the CPU 52. The RAM 53 includes a volatile memory such as an SDRAM. The program memory 54 stores a program to be executed by the CPU 52. As the program memory 54, a ROM, a storage 55, or a combination thereof, for example, is used. The controller 51 operates in accordance with the program. For example, the CPU 52 performs data processing in accordance with the program by loading, onto the RAM 53, the program stored in the program memory 54 and interpreting and executing the program.

The storage 55 stores data in a non-transitory manner. The storage 55 includes a non-volatile memory such as a hard disk drive (HDD) or a solid state drive (SSD).

The wireless module 56 is configured to perform wireless communication with external information processing apparatuses (the base stations 11 illustrated in FIG. 1, for example). In the present embodiment, the wireless module 56 includes a Wi-Fi module. The wireless module 56 may further include a Bluetooth (registered trademark) module. The wireless module 56 may be a processing circuit including a processor, a memory, and an RF circuit, such as a chipset. The wireless module 56 is connected to the antenna 57. Note that the antenna 57 may be included in the wireless module 56.

The wireless module 56 receives data from the controller 51, generates a data frame including the received data, converts the generated data frame into a wireless signal, and transmits the wireless signal via the antenna 57, for example. Further, the wireless module 56 transmits a control frame such as a cooperation request frame. Furthermore, the wireless module 56 receives a wireless signal via the antenna 57 and extracts a MAC frame from the received wireless signal. In a case in which the MAC frame is a data frame, the wireless module 56 transfers the data frame to the controller 51. In a case in which the MAC frame is a beacon frame, the wireless module 56 processes the beacon frame.

The input/output interface 58 includes an input apparatus for inputting data to the terminal 12, an output device for outputting data from the terminal 12, and a terminal to which a peripheral device is connected. As the input device and the output device, a touch screen including a display and a touch sensor is typically used. The input device may further include a microphone. The output device may further include a speaker.

The battery 59 is a chargeable battery. The battery 59 supplies power to the controller 51, the storage 55, the wireless module 56, the antenna 57, and the input/output interface 58.

Figure 6:
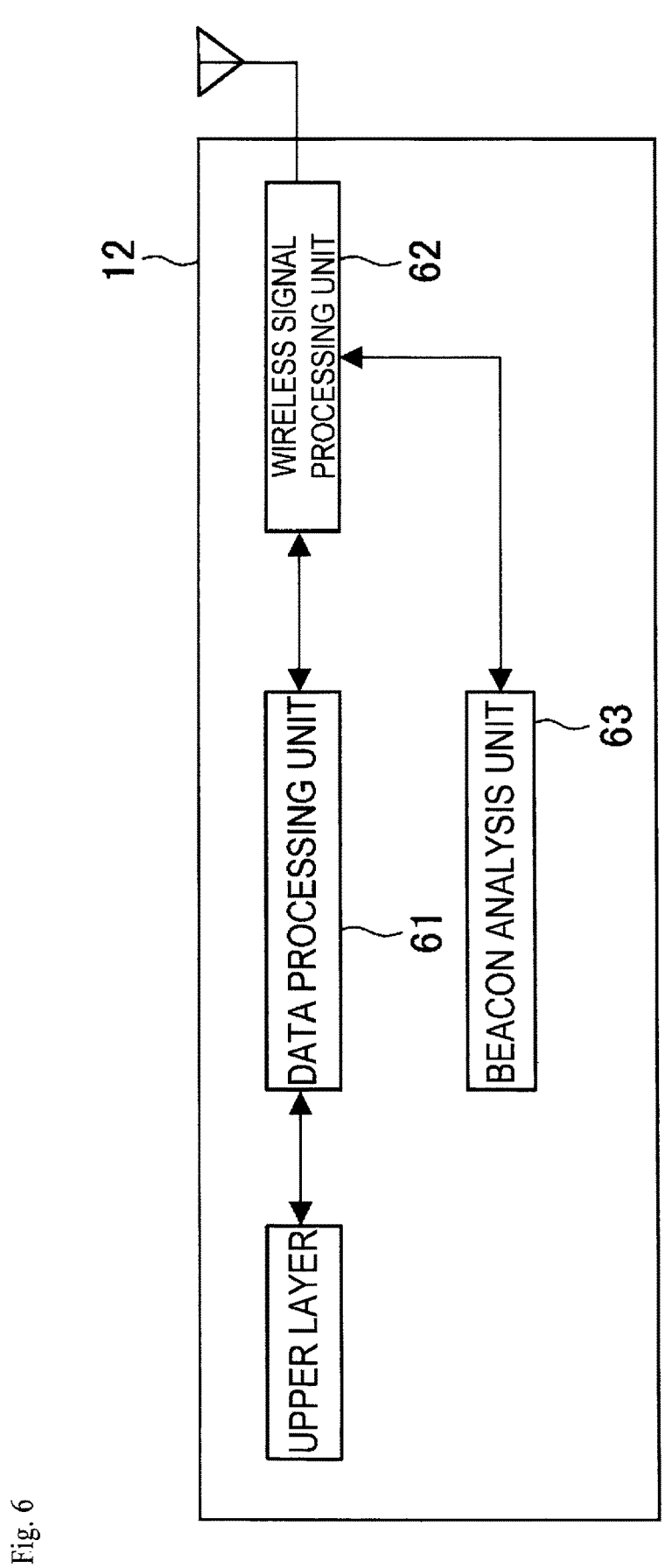
FIG. 6 is a block diagram illustrating a functional configuration example of the terminal illustrated in FIG. 1.

FIG. 6 schematically illustrates an example of a functional configuration of the terminal 12. As illustrated in FIG. 6, the terminal 12 includes a data processing unit 61, a wireless signal processing unit 62, and a beacon analysis unit 63. The wireless signal processing unit 62 includes a transmission unit that transmits a wireless signal and a reception unit that receives a wireless signal. The data processing unit 61, the wireless signal processing unit 62, and the beacon analysis unit 63 are realized by a processing circuit including the controller 51 and the wireless module 56. In an example, a part of the data processing unit 61 is realized by the controller 51, and remaining parts of the data processing unit 61, the beacon analysis unit 63, and the wireless signal processing unit 62 are realized by the wireless module 56.

The data processing unit 61 receives data from an upper layer such as an application executed by the controller 51, generates a data frame including the received data, and transfers the generated data frame to the wireless signal processing unit 62. The application is not limited to any specific application. For example, the application may be a real-time application (RTA) such as a control application for a network game or an industrial robot. The wireless signal processing unit 62 receives the data frame from the data processing unit 61, converts the received data frame into a wireless signal, and transmits the wireless signal.

The wireless signal processing unit 62 receives a wireless signal, extracts an MAC frame from the received wireless signal, and transfers the MAC frame to the data processing unit 61. The data processing unit 61 receives the MAC frame from the wireless signal processing unit 62. In a case in which the MAC frame is a data frame, the data processing unit 61 extracts data from the data frame and passes the extracted data to the upper layer. The data is used by the application, for example.

In a case in which the MAC frame is a beacon frame, the data processing unit 61 transfers the beacon frame to the beacon analysis unit 63. The beacon analysis unit 63 receives the beacon frame from the data processing unit 61 and analyzes the received beacon frame. The beacon analysis unit 63 checks channel identification information and an access parameter value in communication channel information included in the beacon frame. In a case in which the communication channel information includes a TXOP Limit value and does not include CWmax, CWmin, and AIFS values, for example, the beacon analysis unit 63 voluntarily determines the CWmax, CWmin, and AIFS values. The beacon analysis unit 63 notifies the wireless signal processing unit 62 of the channel to be used and the access parameter value. The wireless signal processing unit 62 performs wireless communication in accordance with the information received from the beacon analysis unit 63.

The data processing unit 61 receives a request related to communication properties from the upper layer. The request includes an allowable value for communication criteria such as a transmission delay, for example. For example, at least a part of data output from the aforementioned application has an allowable value for a delay, and the application requests the data processing unit 61 for transmission of data to satisfy the allowable value for a delay. The data processing unit 61 generates a cooperation request frame for providing a request for channel cooperative utilization in response to the request from the upper layer, and the wireless signal processing unit 62 converts the cooperation request frame into a wireless signal and transmits the wireless signal. In an example, the cooperation request frame includes an allowable value for communication criteria. In another example, the data processing unit 61 determines an access parameter value based on the allowable value for communication criteria, and the cooperation request frame includes the access parameter value determined by the data processing unit 61. The data processing unit 61 and the wireless signal processing unit 62 function as a request unit that provides a cooperation request to the base station 11.

Figure 7:
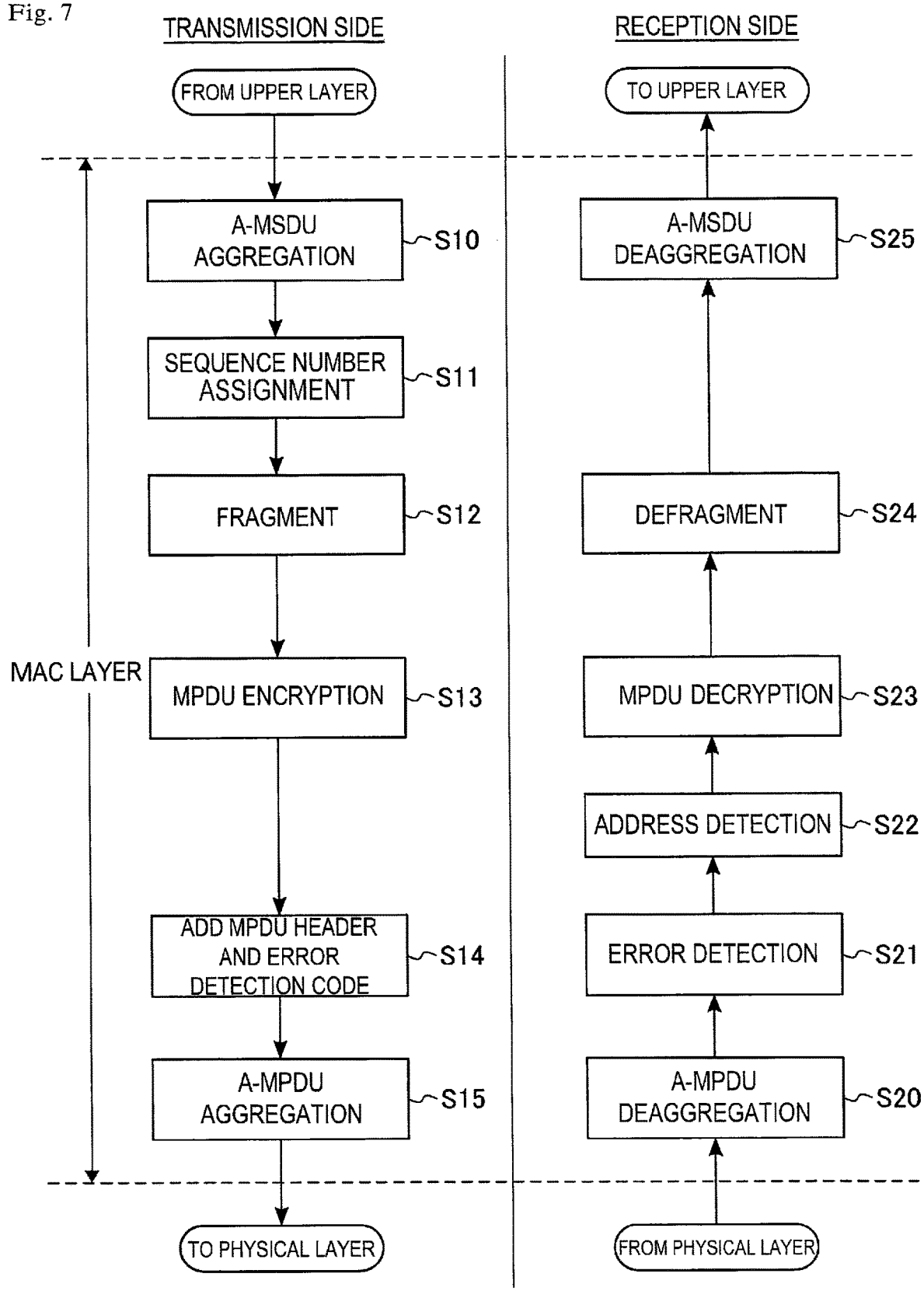
FIG. 7 is a diagram illustrating processing related to data exchange between the base station and the terminal illustrated in FIG. 1.

FIG. 7 schematically illustrates processing of a MAC layer related to data exchange between the base station 11 and the terminal 12. FIG. 7 illustrates both processing on the transmission side and processing on the reception side. When the wireless module of either the base station 11 or the terminal 12 performs the processing on the transmission side, the other wireless module performs the processing on the reception side. In the following example, the wireless modules on the transmission side and the reception side will be described without any distinction.

First, the processing on the transmission side will be described. In Step S10, the wireless module performs A-MSDU aggregation. Specifically, the wireless module merges a plurality of items of data input from the upper layer such as an application layer to generate an aggregate-MAC service data unit (A-MSDU).

In Step S11, the wireless module assigns a sequence number (SN) to the A-MSDU. The sequence number is a unique number for identifying the A-MSDU.

In Step S12, the wireless module fragments (splits) the A-MSDU into a plurality of MAC protocol data units (MPDUs).

In Step S13, the wireless module encrypts each MPDU to generate an encrypted MPDU.

In Step S14, the wireless module adds an MAC header and an error detection code to each encrypted MPDU. The error detection code is, for example, a cyclic redundancy check (CRC) code.

In Step S15, the wireless module performs A-MPDU aggregation. Specifically, the wireless module integrates the plurality of MPDUs to generate an aggregate-MAC protocol data unit (A-MPDU) as a MAC frame.

After Step S15, the wireless module performs physical layer processing on the MAC frame. In other words, the wireless module performs modulation processing or the like on the MAC frame to generate a wireless signal and transmits the wireless signal to the base station 11.

Next, the processing on the reception side will be described. When a wireless signal is received, the wireless module performs physical layer processing to restore a MAC frame from the wireless signal. Thereafter, the wireless module performs MAC layer processing illustrated in FIG. 7.

In Step S20, the wireless module performs A-MPDU deaggregation. Specifically, the wireless module splits the A-MPDU in units of MPDUs.

In Step S21, the wireless module performs error detection. For example, the wireless module determines whether the wireless signal has been successfully received, by the CRC. When the reception of the wireless signal has been failed, the wireless module may provide a retransmission request. At this time, the wireless module may provide a request for retransmission in units of MPDUs. On the other hand, when the wireless signal has been successfully received, the wireless module performs the following processing.

In Step S22, the wireless module performs address detection. At this time, the wireless module determines whether a transmitted MPDU has been directed to the wireless module itself based on an address recorded in a MAC header of each MPDU. When the MPDU has not been directed to the wireless module itself, the wireless module does not perform the following processing. When the MPDU has been directed to the wireless module itself, the wireless module performs the following processing.

In Step S23, the wireless module decrypts the encrypted MPDU.

In Step S24, the wireless module performs defragment on the MPDU. In other words, the wireless module restores the A-MSDU from a plurality of MPDUs.

In Step S25, the wireless module performs A-MSDU deaggregation. Specifically, the wireless module restores the A-MSDU to data in units of MSDUs.

After Step S25, the wireless module outputs the data to the upper layer of the MAC layer. The upper layer is, for example, an application layer.

Operations

Next, an operation example of the communication system 10 will be described.

Figure 8:
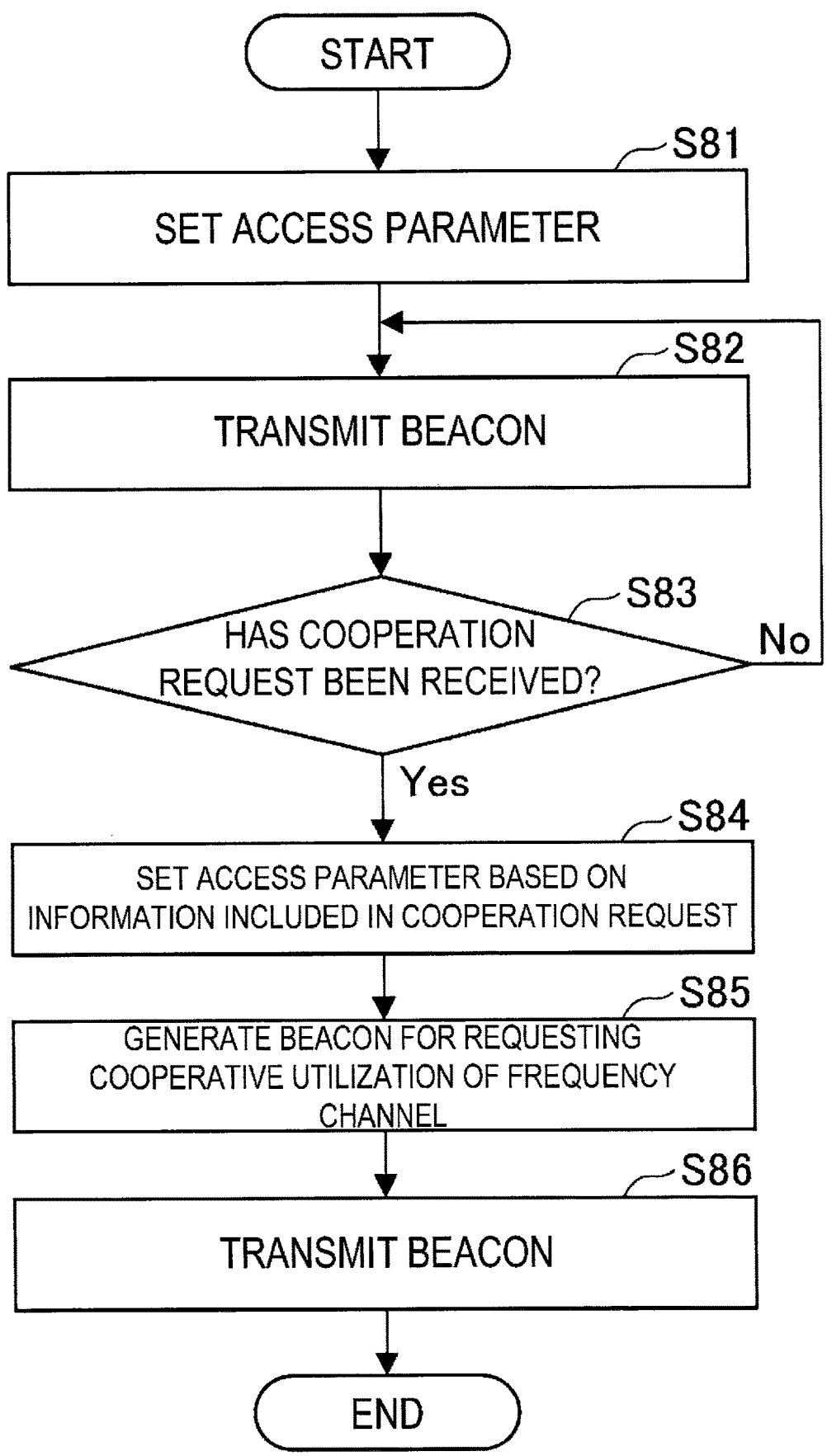
FIG. 8 is a flowchart illustrating an operation example of the base station illustrated in FIG. 1.

FIG. 8 schematically illustrates an example of processing in which the base station 11 transmits a beacon.

In Step S81 in FIG. 8, the access parameter setting unit 34 sets an access parameter for accessing a channel that the base station 11 is currently using. For example, the access parameter setting unit 34 sets the access parameter as a default value. For example, the access parameter includes CWmax, CWmin, AIFS, and TXOP Limit related to the access category AC_VO, CWmax, CWmin, AIFS, and TXOP Limit related to the access category AC_VI, CWmax, CWmin, AIFS, and TXOP Limit related to the access category AC_BE, and CWmax, CWmin, AIFS, and TXOP Limit related to the access category AC_BK.

In Step S82, the wireless signal processing unit 32 transmits a beacon including the access parameter value set by the access parameter setting unit 34 in the communication channel information. At this time, the cooperative utilization flag is set to the value "0" indicating that the channel is not to be cooperatively used.

In a case in which the base station 11 has not received the cooperation request from the terminal 12 (Step S83; No), the processing in Step S82 is repeated. At this time, the access parameter setting unit 34 may adjust the access parameter in accordance with a communication environment such as the number of terminals in communication. In a case in which the base station 11 has received the cooperation request from the terminal 12 (Step S83; Yes), the processing proceeds to Step S84.

In Step S84, the access parameter setting unit 34 sets the access parameter in response to the cooperation request. In a case in which the cooperation request designates the access parameter value, the access parameter setting unit 34 employs the value designated by the cooperation request. In a case in which the cooperation request designates the value of TXOP Limit related to each of the access categories AC_VO, AC_VI, AC_BE, and AC_BK, for example, the access parameter setting unit 34 sets TXOP Limit related to each of the access categories AC_VO, AC_VI, AC_BE, and AC_BK to the value designated by the cooperation request and sets the other access parameters to values determined by the access parameter setting unit 34 itself.

In Step S85, the beacon generation unit 35 generates a beacon in which the cooperative utilization flag has been set to the value "1" indicating that the channel is to be cooperatively used. The beacon includes, in the cooperative utilization channel information, channel identification information for identifying the channel to be cooperatively used and the access parameter (the value set in Step S84) for accessing the channel to be cooperatively used. In Step S86, the wireless signal processing unit 32 transmits the beacon.

In this manner, when receiving a cooperation request from the terminal 12, the base station 11 requests another base station 11 that is present in the surroundings for cooperative utilization of a specific channel. The base station 11 may terminate the cooperative utilization of the channel at an arbitrary timing. In an example, the base station 11 may return the access parameter to the default value when the base station 11 receives a termination request from the terminal 12. In another example, the base station 11 may return the access parameter to the default value after a predetermined time elapses from a timing at which the cooperation request is received.

Figure 9:
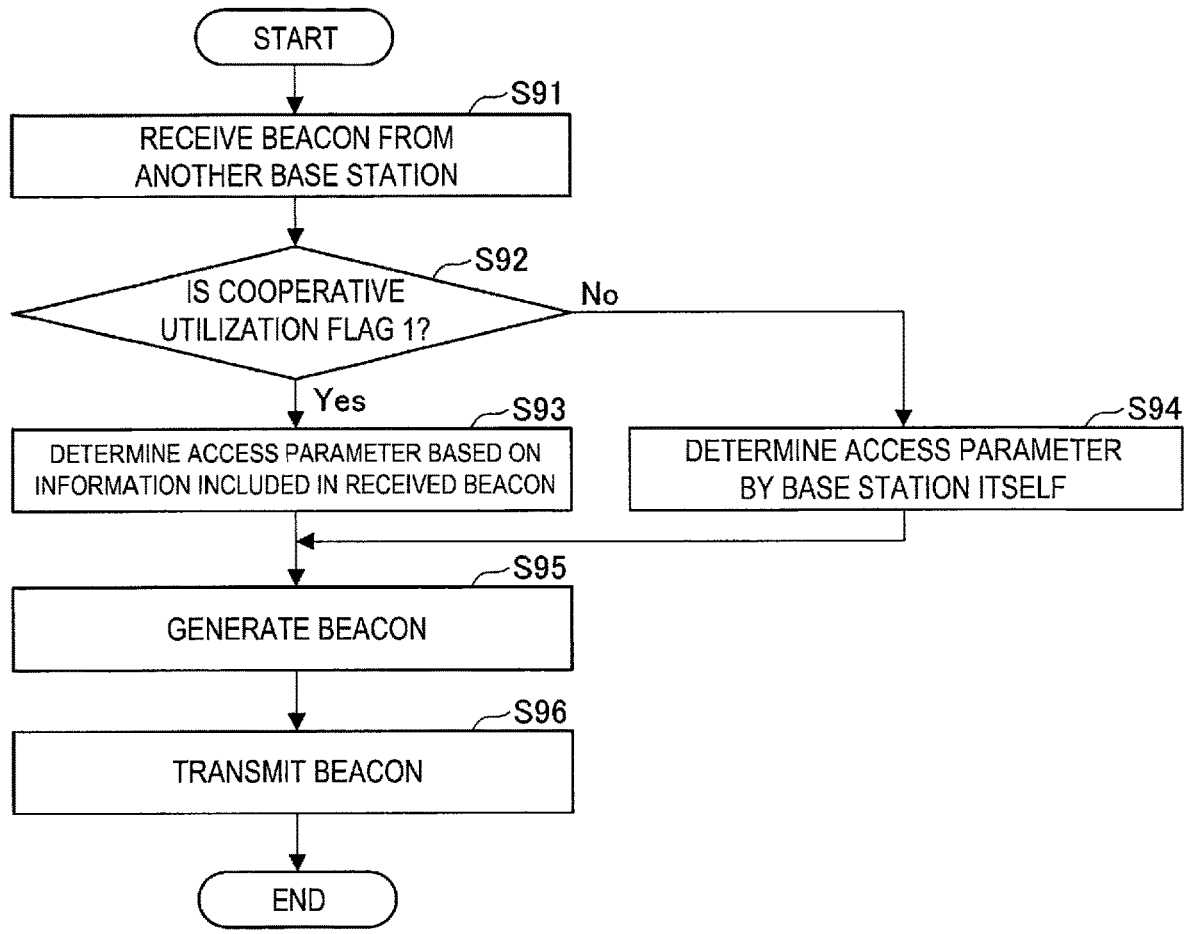
FIG. 9 is a flowchart illustrating an operation example of the base station illustrated in FIG. 1.

FIG. 9 schematically illustrates another example of processing in which the base station 11 transmits a beacon signal.

In Step S91 in FIG. 9, the wireless signal processing unit 32 receives a beacon from another base station 11 (another BSS). For example, the base station 11 that performs the processing illustrated in FIG. 9 is the base station 11-2 illustrated in FIG. 1, and another base station 11 is the base station 11-1 illustrated in FIG. 1.

In Step S92, the beacon analysis unit 33 determines whether the cooperative utilization flag included in the reception beacon is the value "1" for a request for cooperative utilization. In a case in which the cooperative utilization flag is the value "0" that is not a request for cooperative utilization (Step S92; No), the processing proceeds to Step S94. In Step S94, the access parameter setting unit 34 sets the access parameter to a value determined by the access parameter setting unit 34 itself (a default value, for example).

In a case in which the cooperative utilization flag is the value "1" that is a request for cooperative utilization (Step S92; Yes), the processing proceeds to Step S93. In Step S93, in a case in which the wireless signal processing unit 32 is using the same channel as that indicated by the cooperative utilization channel information, the access parameter setting unit 34 sets the access parameter using the access parameter in the cooperative utilization channel information included in the beacon.

In Step S95, the beacon generation unit 35 generates a beacon including, in the communication channel information, the access parameter set in Step S93 or Step S94. In a case in which the access parameter value is set in Step S94, the beacon generation unit 35 may set the cooperative utilization flag to the value "1" indicating the cooperative utilization of the channel. In Step S96, the wireless signal processing unit 32 transmits the beacon.

In this manner, when the base station 11 receives from another base station a request for cooperative utilization of a specific channel, in a case in which that channel is to be used for communication with the terminal 12, the base station 11 sets the access parameter in accordance with the request from the other base station 11.

Figure 10:
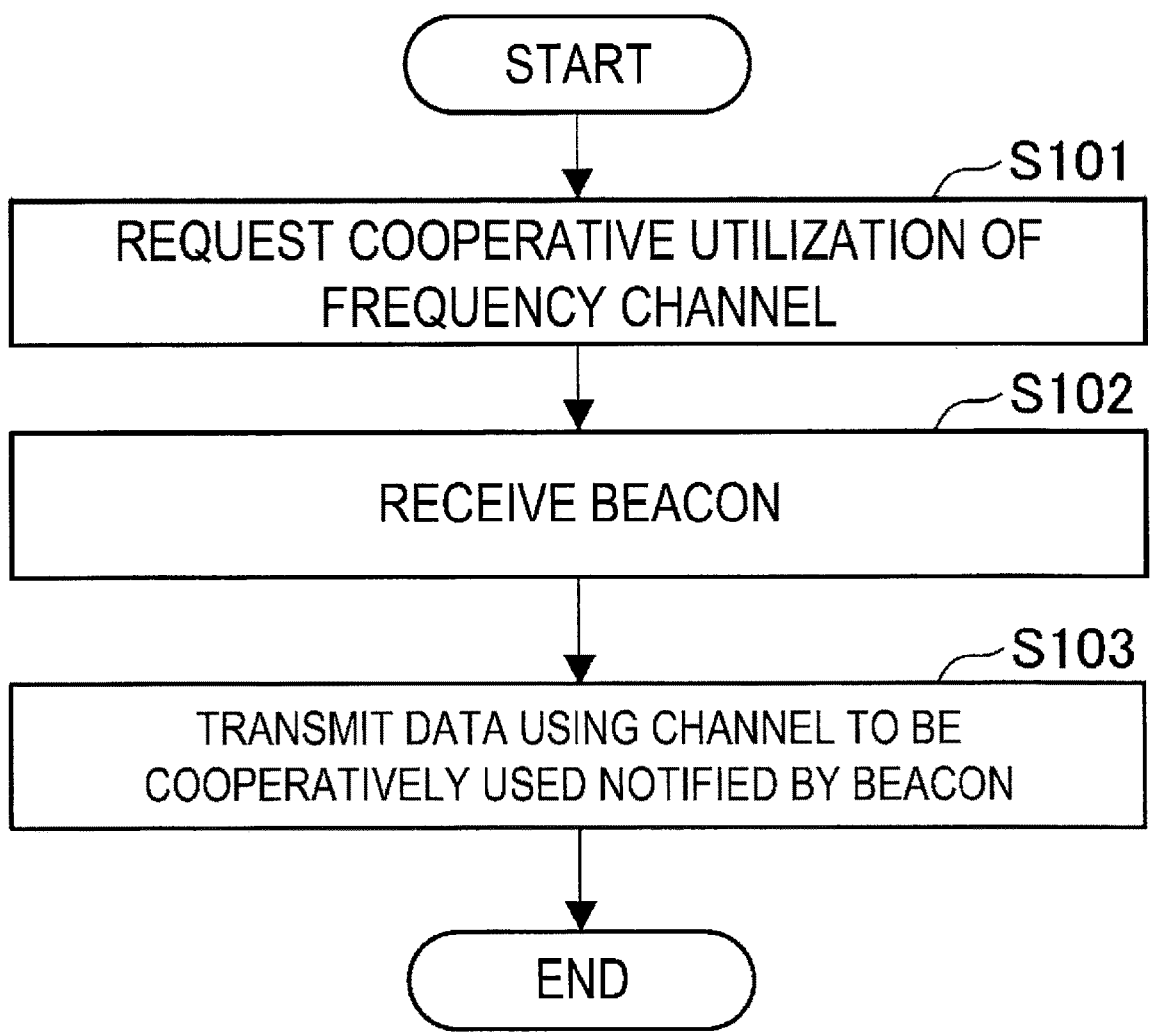
FIG. 10 is a flowchart illustrating an operation example of the terminal illustrated in FIG. 1.

FIG. 10 schematically illustrates processing in which the terminal 12 transmits data with an allowable condition for a delay.

In Step S101 in FIG. 10, the terminal 12 requests the base station 11 for cooperative utilization of a channel based on the allowable condition for a delay. For example, the data processing unit 61 determines the value of TXOP Limit for each access category based on the allowable condition, and the wireless signal processing unit 62 transmits a cooperation request including the value of TXOP Limit for each access category. The base station 11 that has received the cooperation request selects the channel to be cooperatively used from among available channels, and transmits a beacon including, in the cooperative utilization channel information, switching information set to be information indicating that the channel is to be cooperatively used, channel identification information for identifying the channel to be cooperatively used, and an access parameter for accessing the channel to be cooperatively used. The base station 11 further provides a notification of a change in channel to be used to the channel to be cooperatively used, through the communication channel information in the beacon.

In Step S102, the terminal 12 receives the beacon from the base station 11. In Step S103, the terminal 12 transmits data with the allowable condition for a delay using the channel to be cooperatively used and notified by the beacon.

Figure 11:
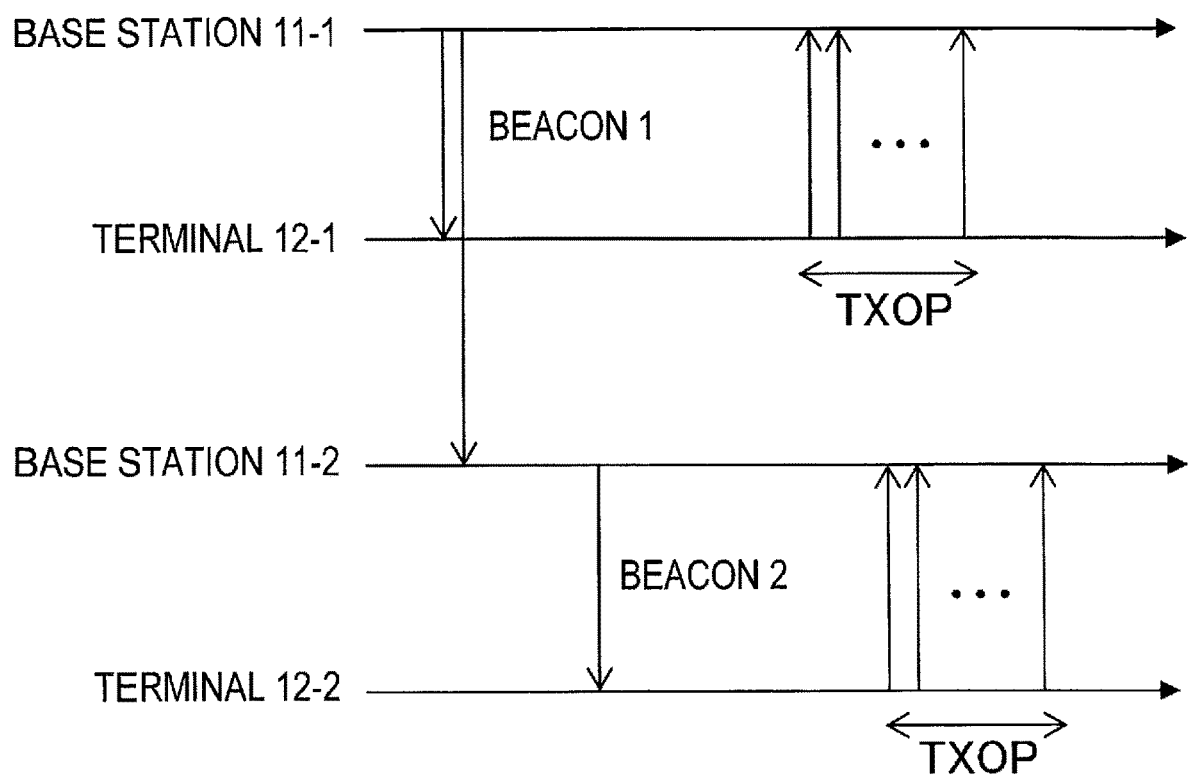
FIG. 11 is a sequence diagram for explaining an operation example of the communication system illustrated in FIG. 1.

Referring to FIG. 11, an example of operations of the communication system 10 will be described. The base station 11-1 uses a beacon 1 to provide a notification of the fact that the channel is to be cooperatively used, the number of the channel to be cooperatively used, and the access parameter for accessing the channel to be cooperatively used.

The base station 11-2 receives the beacon 1. The base station 11-2 extracts the access parameter from the beacon 1, generates a beacon 2 using the extracted access parameter, and provides, using the beacon 2, a notification of the access parameter for accessing the channel to be cooperatively used.

The terminals 12-1 and 12-2 access the channel using the access parameter provided as the notification in the beacons 1 and 2, respectively. In this manner, the terminals 12-1 and 12-2 use the same access parameter in a case in which the terminals 12-1 and 12-2 access the same channel. Thus, a channel is not used by some of terminals 12 for a long time, and the channel is released at a short cycle, by setting TXOP Limit to a small value. Thus, the opportunities in which low-latency traffics can access channels increase, and it is thus possible to enhance reliability.

Advantageous Effects

As described above, each base station 11 transmits a beacon including switching information indicating whether to cooperatively use a channel in the present embodiment. In a case in which the switching information indicates that the channel is to be cooperatively used, the beacon further includes channel identification information for identifying the channel to be cooperatively used and an access parameter for accessing the channel to be cooperatively used. Another base station 11 that has received the beacon generates a beacon including the access parameter designated by the received beacon and transmits the generated beacon in a case in which the channel to be cooperatively used conforms to the channel that the base station 11 itself is using. In this manner, the same access parameter, that is, a unified access parameter is used in relation to a specific channel in the surrounding environment of the base station 11. It is thus possible to avoid degradation of communication quality due to influences of BSSs different from the BSS of the base station 11. As a result, reliability of wireless communication is improved.

In a case in which a low latency property is required, for example, TXOP Limit is shortened. Rotation of transmission rights is enhanced by shortening TXOP Limit. As a result, it is possible to improve the low latency property.

In a case in which each base station 11 receives, from another base station, a beacon including switching information set to be information indicating that a frequency channel is to be cooperatively used, the base station 11 may set, in a beacon that the base station 11 itself transmits, the switching information as information indicating that the frequency channel is to be cooperatively used. In this manner, cooperative utilization is performed in a wider range. As a result, it is possible to further improve the low latency property.

Modification Examples

The present disclosure is not limited to the aforementioned embodiment. In an embodiment, the base station 11 may receive a cooperation request from the network 13, for example, a server that exchanges data with an application of the terminal 12 via the network 13.

The aforementioned processing may be executed based on a program that is software. For example, a part or an entirety of the aforementioned processing of the base station 11 is executed by a processor of the base station 11 executing the program. The program may be provided to the base station 11 in a state in which the program is stored in a computer-readable storage medium. In this case, the base station 11 includes a drive for reading data from the storage medium and acquires the program from the storage medium, for example. Examples of the storage medium include magnetic disks, optical discs (a CD-ROM, a CD-R, a DVD-ROM, a DVD-R, and the like), magneto-optical discs (an MO and the like), and semiconductor memories. Further, the program may be stored in a server on the network 13, and the base station 11 may download the program from the server.

The present disclosure is not limited to the aforementioned embodiments as they are and can be embodied with the components modified without departing from the gist of the present disclosure in a stage of implementation. Furthermore, various inventions can be formed by appropriately combining a plurality of components disclosed in each of the aforementioned embodiments. For example, several components may be omitted from all the components described in each of the embodiments. Furthermore, components in different embodiments may be appropriately combined with each other.

REFERENCE SIGNS LIST

10 Communication system
11 Base station
12 Terminal
13 Network
21 Controller
22 CPU
23 RAM
24 Program memory
25 Wireless module
26 Antenna
27 Router module
31 Data processing unit
32 Wireless signal processing unit
33 Beacon analysis unit
34 Access parameter setting unit
35 Beacon generation unit
36 Communication unit
51 Controller
52 CPU
53 RAM
54 Program memory
55 Storage
56 Wireless module
57 Antenna
58 Input/output interface
59 Battery
61 Data processing unit
62 Wireless signal processing unit
63 Beacon analysis unit

The invention claimed is:

1. A base station belonging to a first basic service set (BSS), the base station comprising:
    processing circuitry configured to generate a first beacon, the first beacon including switching information indicating a frequency channel is to be cooperatively used, channel identification information identifying the frequency channel, and an access parameter for accessing the frequency channel; and
    a wireless module configured to transmit the first beacon to a first terminal belonging to the first BSS and another base station belonging to a second BSS different from the first BSS, wherein in response to receiving the first beacon, the first terminal and the another base station use the access parameter included in the first beacon to communicate using the frequency channel.

2. The base station according to claim 1, wherein when the switching information indicates that the frequency channel is to be cooperatively used, the first beacon further includes channel identification information for identifying the frequency channel and an access parameter for accessing the frequency channel.

3. The base station according to claim 2, wherein the access parameter includes TXOP Limit.

4. The base station according to claim 1,
wherein the wireless module is further configured to receive a cooperation request for requesting cooperative utilization of the frequency channel,
wherein the processing circuitry is configured to generate the first beacon including the switching information set to be information indicating that the frequency channel is to be cooperatively used in response to the cooperation request.

5. The base station according to claim 1,
wherein the processing circuitry is further configured to receive, from another base station, a second beacon including switching information set to be information indicating that the frequency channel is to be cooperatively used, channel identification information for identifying the frequency channel, and an access parameter for accessing the frequency channel,
wherein when the base station is using the frequency channel for communication, the processing circuitry generates the first beacon to include the access parameter for accessing the frequency channel in response to the second beacon.

6. The base station according to claim 5, wherein the generation unit generates the first beacon including the switching information set to be information indicating that the frequency channel is to be cooperatively used in response to the second beacon.

* * * * *